United States Patent
Basnet et al.

(10) Patent No.: US 12,140,660 B2
(45) Date of Patent: Nov. 12, 2024

(54) DETECTION SYSTEM AND DETECTION METHOD

(71) Applicant: WISTRON NEWEB CORPORATION, Hsinchu (TW)

(72) Inventors: Modick Bahadur Basnet, Hsinchu (TW); Chi-Cheng Kuo, Hsinchu (TW); Jeng-Da Li, Hsinchu (TW)

(73) Assignee: WISTRON NEWEB CORPORATION, Hsinchu (TW)

(*) Notice: Subject to any disclaimer, the term of this patent is extended or adjusted under 35 U.S.C. 154(b) by 510 days.

(21) Appl. No.: 17/691,157

(22) Filed: Mar. 10, 2022

(65) Prior Publication Data
US 2023/0070639 A1   Mar. 9, 2023

(30) Foreign Application Priority Data
Sep. 3, 2021 (TW) .................. 110132766

(51) Int. Cl.
*G01S 13/72* (2006.01)
*G06F 18/21* (2023.01)

(52) U.S. Cl.
CPC ............ *G01S 13/726* (2013.01); *G06F 18/21* (2023.01)

(58) Field of Classification Search
CPC .................................................. G01S 13/726
USPC ..................................................... 342/27, 28
See application file for complete search history.

(56) References Cited

U.S. PATENT DOCUMENTS

| | | | |
|---|---|---|---|
| 2020/0064784 A1* | 2/2020 | Steiner | G01S 13/34 |
| 2020/0284883 A1* | 9/2020 | Ferreira | H04N 25/773 |
| 2022/0120845 A1* | 4/2022 | Gulati | H04W 4/40 |

FOREIGN PATENT DOCUMENTS

WO   WO-2020154962 A1 * 8/2020 ............ G01S 13/52

* cited by examiner

*Primary Examiner* — Vladimir Magloire
*Assistant Examiner* — Eric K Hodac
(74) *Attorney, Agent, or Firm* — McClure, Qualey & Rodack, LLP

(57) ABSTRACT

A detection system and a detection method are provided. The detection method includes configuring a processing circuit to perform an initialization phase, which includes: executing a detection process to respectively accumulate numbers of times that objects are detected to be present in sub-areas, so as to generate initial count values; and configuring the processing circuit to perform a normal operation phase, which includes: executing the detection process to respectively accumulate numbers of times that the objects are detected to be present in the sub-areas, so as to generate current count values corresponding to the sub-areas; and comparing the current count value with the initial count value in a current sub-area of the sub-areas. In response to the current count value being greater than the initial count value plus a first count threshold, a new stationary object is determined to be present in the current sub-area.

14 Claims, 8 Drawing Sheets

DETECTION SYSTEM AND DETECTION METHOD

CROSS-REFERENCE TO RELATED PATENT APPLICATION

This application claims the benefit of priority to Taiwan Patent Application No. 110132766, filed on Sep. 3, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a detection system and a detection method, and more particularly to a detection system and a detection method capable of detecting newly-appearing stationary objects and distinguishing the newly-appearing stationary objects from existing stationary objects.

BACKGROUND OF THE DISCLOSURE

Highway conditions need to be continuously monitored for safety and protection of lives and properties. On highways, if a vehicle suddenly stops due to mechanical failure or a driver falling unconscious, dangerous situations are likely to occur. Under this circumstance, relevant authorities should be notified to close a lane with an unmoving vehicle, remove obstacles, and then re-open the lane.

Conventional road detection technologies involve the use of inductive loop detectors, wireless magnetometers, cameras, radars, communication modules, and the like. However, the foregoing devices have their limitations.

For example, the inductive loop detectors are easily affected by road conditions, and will deteriorate with age. Each device equipped with the magnetometer needs to be allocated to a power grid, and installation of the device is required every certain distance, such that a large number of the device is required. In addition, a performance of the camera may deteriorate due to poor weather.

Compared with the above-mentioned equipment, radars are cheaper to manage and maintain, and a radar system can operate in all weather conditions. The drawback of the radar system is that its field of view is limited, and only objects in a line-of-sight can be detected. In other words, if a smaller object is obscured by a larger object in the field of view of the radar and cannot be seen by the radar, the obscured object may not be detected.

In addition, traditional radars need to track detection data of moving objects for prediction and warning. If the smaller object stops moving in proximity to stationary objects, the smaller object may not be detected. This limits the capacity of the traditional radar system to detect and distinguish a new stationary object from old stationary objects.

SUMMARY OF THE DISCLOSURE

In response to the above-referenced technical inadequacies, the present disclosure provides a detection system and a detection method capable of detecting newly-appearing stationary objects and distinguishing the newly-appearing stationary objects from existing stationary objects.

In one aspect, the present disclosure provides a detection system, which includes a transmitter, a receiver and a processing circuit. The processing circuit is connected to the transmitter and the receiver, and the processing circuit is configured to execute a detection process, which includes: controlling the transmitter to transmit a detection signal toward a detection area with a predetermined antenna pattern, in which the predetermined antenna pattern covers the detection area; controlling the receiver to receive a plurality of reflected signals; and processing the plurality of reflected signals to generate a detection result, so as to respectively determine whether or not objects are present in a plurality of sub-areas of the detection area. The processing circuit is configured to perform an initialization phase, which includes: respectively accumulating numbers of times that the objects are detected to be present in the plurality of sub-areas when the detection process is executed, so as to generate a plurality of initial count values corresponding to the plurality of sub-areas after the detection process is executed for the first predetermined number of times. The plurality of initial count values are used to respectively indicate whether or not existing stationary objects are present in the plurality of sub-areas. The processing circuit is configured to perform a normal operation phase after the initialization phase, and the normal operation phase includes: executing the detection process for a second predetermined number of times; respectively accumulating numbers of times that the objects are detected to be present in the plurality of sub-areas when the detection procedure is executed, so as to generate a plurality of current count values corresponding to the plurality of sub-areas after the detection process is executed for the second predetermined number of times; and comparing the current count value with the initial count value in a current sub-area of the plurality of sub-area. In response to the current count value exceeding a sum of the initial count value and a first count threshold in the current sub-area, a new stationary object is determined to be present in the current sub-area. The normal operation phase further includes: counting a number of the plurality of sub-areas in which the new stationary object is present, so as to generate a statistical result that is used to indicate a state of the detection area.

In another aspect, the present disclosure provides a detection method, which includes: configuring a processing circuit connected to a transmitter and a receiver to execute a detection process, which includes: controlling the transmitter to transmit a detection signal toward a detection area with a predetermined antenna pattern, in which the predetermined antenna pattern covers the detection area; controlling the receiver to receive a plurality of reflected signals; and processing the plurality of reflected signals to generate a detection result, so as to respectively determine whether or not objects are present in a plurality of sub-areas of the detection area. The detection method further includes configuring the processing circuit to perform an initialization phase, and perform a normal operation phase after the initialization phase. The initialization phase includes: executing the detection process for a first predetermined number of times; and respectively accumulating numbers of times that the objects are detected to be present in the plurality of sub-areas when the detection process is executed, so as to generate a plurality of initial count values corresponding to the plurality of sub-areas after the detection process is executed for the first predetermined number of times. The plurality of initial count values are used to respectively indicate whether or not existing stationary objects are present in the plurality of sub-areas. The normal operation phase includes: executing the detection process for a second predetermined number of times; respectively accumulating numbers of times that the objects are detected to be present in the plurality of sub-areas when the detection process is executed, so as to generate a plurality of current count values corresponding to the plurality of sub-areas after the detection process is executed for the second predetermined number of times; and comparing the current count value with the initial count value in a current sub-area of the plurality of sub-area. In response to the current count value exceeding the initial count value added with a first count threshold in the current sub-area, detecting that a new stationary object is present in the current sub-area. The normal operation phase further includes: counting a number of the plurality of sub-areas in which the new stationary object being present to generate a statistical result, which is used to indicate the state of the detection area.

Therefore, the detection system and the detection method provided by the present disclosure can record an environment and stationary objects, use recorded data to detect new stationary objects, and distinguish the new stationary objects from existing stationary objects.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
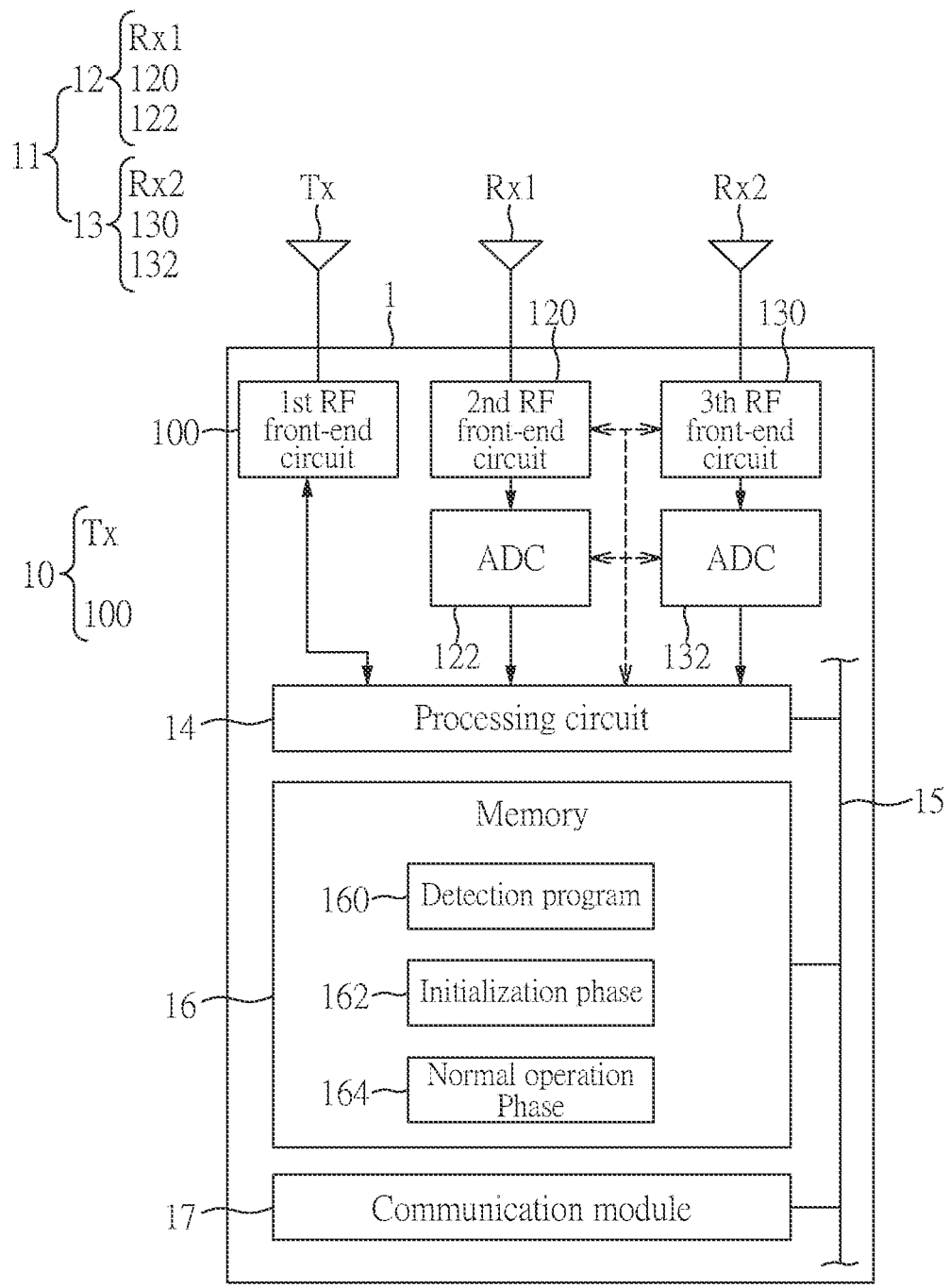
FIG. 1 is a functional block diagram of a detection system according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1, one embodiment of the present disclosure provides a detection system 1, which includes a transmitter 10, a receiver 11, a processing circuit 14, a memory 16 and a communication module 17. The above-mentioned components can communicate with each other through, for example, but not limited to, a bus 15.

The transmitter 10 can include a transmitting antenna Tx and a first radio frequency (RF) front-end circuit 100, and the receiver 11 can include a first receiving circuit 12 and a second receiving circuit 13. The first receiving circuit 12 includes a first receiving antenna Rx1, a second RF front-end circuit 120, and an analog-to-digital converter (ADC) 122, and the second receiving circuit 13 includes a second receiving antenna Rx2, a third RF front-end circuit 130, and an ADC 132.

The first RF front-end circuit 100 is used to control the transmitter 10, and the second RF front-end circuit 120 and the third RF front-end circuit 130 are used to control the first receiving circuit 12 and the second receiving circuit 13, respectively. The first RF front-end circuit 100, the second RF front-end circuit 120 and the third RF front-end circuit 130 can be integrated in a single or multiple chips. In addition, the ADC 122 can be electrically connected between the second RF front-end circuit 120 and the processing circuit 14, and the ADC 132 can be electrically connected between the third RF front-end circuit 130 and the processing circuit 14. In this way, analog signals can be converted into digital signals, and can be further processed by the processing circuit 14.

The memory 16 can be any storage device that can be used to store data, such as, but not limited to, random access memory (RAM), read only memory (ROM), flash memory, hard disk or other storage device that can be used to store data. The memory 16 is configured to store at least a plurality of computer readable commands. In one embodiment, the memory 16 can also be used to store temporary data generated when the processing circuit 14 performs operations.

The processing circuit 14 can be, for example, a microcontroller, a microprocessor, or a digital signal processor (DSP). The processing circuit 14 is electrically connected to the transmitter 10, the receiver 11, and the memory 16. The processing circuit 14 is configured to access and execute a detection program 160, an initialization phase 162, and a normal operation phase 164 from the memory 16, and control the transmitter 10 and the receiver 11 at the same time. The communication module 17 can also communicate with external devices or a network under the control of the processing circuit 14.

In the following description, a detection method provided by the present disclosure will be illustrated. The detection method can be applied to the detection system 1 of FIG. 1, or can be embodied by other hardware components such as databases, general processors, computers, servers, other hardware devices having unique logic circuits, or a device with specific functions (e.g., a unique hardware that integrates program codes and a processor/chip). In more detail, the detection method can be implemented by using a computer program, so as to control the components of the detection system 1. The computer program can be stored in a non-transitory computer-readable recording medium, such as read-only memory, flash memory, floppy disks, hard disks, optical disks, flash drives, tapes, databases that can be accessed over the Internet, or computer-readable recording media with the same functions that can be easily achieved by those skilled in the arts.

The detection method of the present disclosure can include a detection process, an initialization phase, and a normal operation phase. Since the initialization phase and the normal operation phase both need to execute the detection process for multiple times, the detection process will first be explained in the following description.

Figure 2:
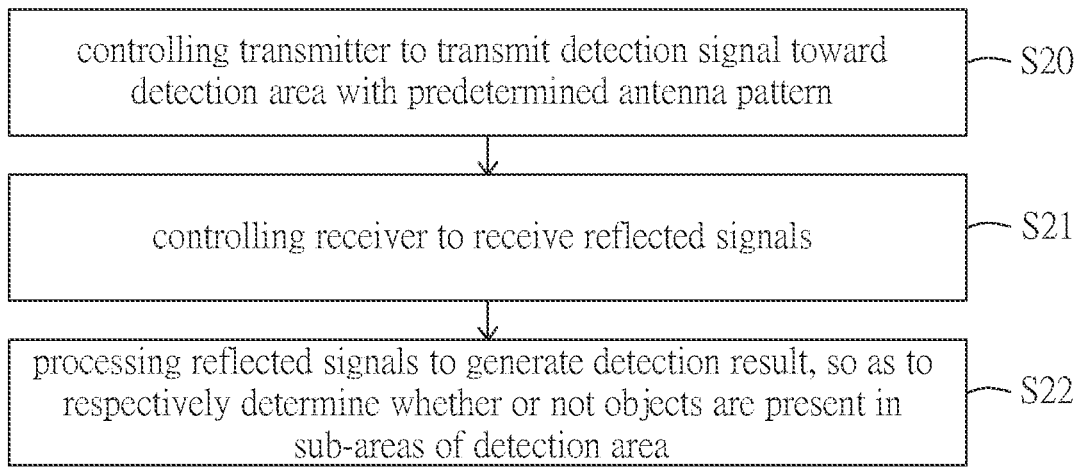
FIG. 2 is a flowchart of a detection process according to one embodiment of the present disclosure.

FIG. 2 is a flow chart of a detection process according to one embodiment of the present disclosure. As shown in FIG. 2, the detection process includes the following steps.

Step S20: controlling the transmitter to transmit a detection signal toward a detection area with a predetermined antenna pattern. The predetermined antenna pattern covers the detection area. For example, the first RF front-end circuit 100 can control the transmitting antenna Tx to form the predetermined antenna pattern in a beamforming manner, and transmit the detection signal toward the detection area.

Step S21: controlling the receiver to receive a plurality of reflected signals. For example, the plurality of reflected signals can be received by the first receiving antenna Rx1 and the second receiving antenna Rx2, and can be transmitted to the processing circuit 14 through the second RF front-end circuit 120, the ADC 122, the third RF front-end circuit 130, and the ADC 132.

Step S22: processing the plurality of reflected signals to generate a detection result, so as to respectively determine whether or not objects are present in a plurality of sub-areas of the detection area.

Figure 3:
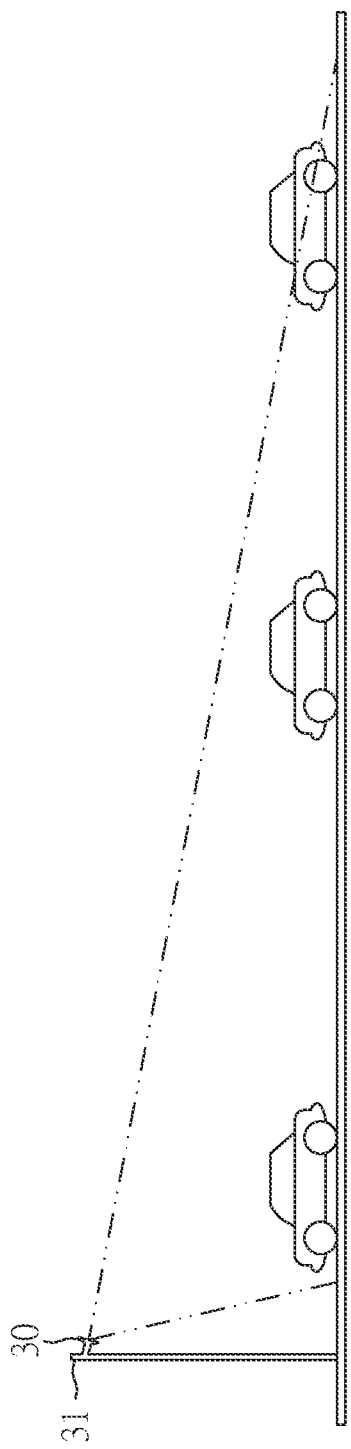
FIG. 3 is a schematic diagram showing installation of a radar according to one embodiment of the present disclosure.

Reference can be made to FIG. 3, which is a schematic diagram of radar installation according to one embodiment of the present disclosure. For example, the detection system 1 provided by the present disclosure can utilize a frequency modulated continuous waveform (FMCW) radar 30, which is installed on an overhead pole 31 facing the road. The FMCW radar 30 can include, for example, the transmitter 10, the receiver 11, and the processing circuit 14. The FMCW radar 30 transmits signals and receives the reflected signals. The reflected signals provide distance information, angle information (that is, the reflected signals describe the detected object in the form of polar coordinate), and a speed of the detected object. It is worth mentioning that a range resolution (often referred to as $\Delta R$) of the FMCW radar 30 is determined by bandwidth (BW) and speed of light (c), that is, $\Delta R=2*BW/c$. Angle measurement and precision thereof depend on an angle measurement technique and radar characteristics that are used.

Figure 4:
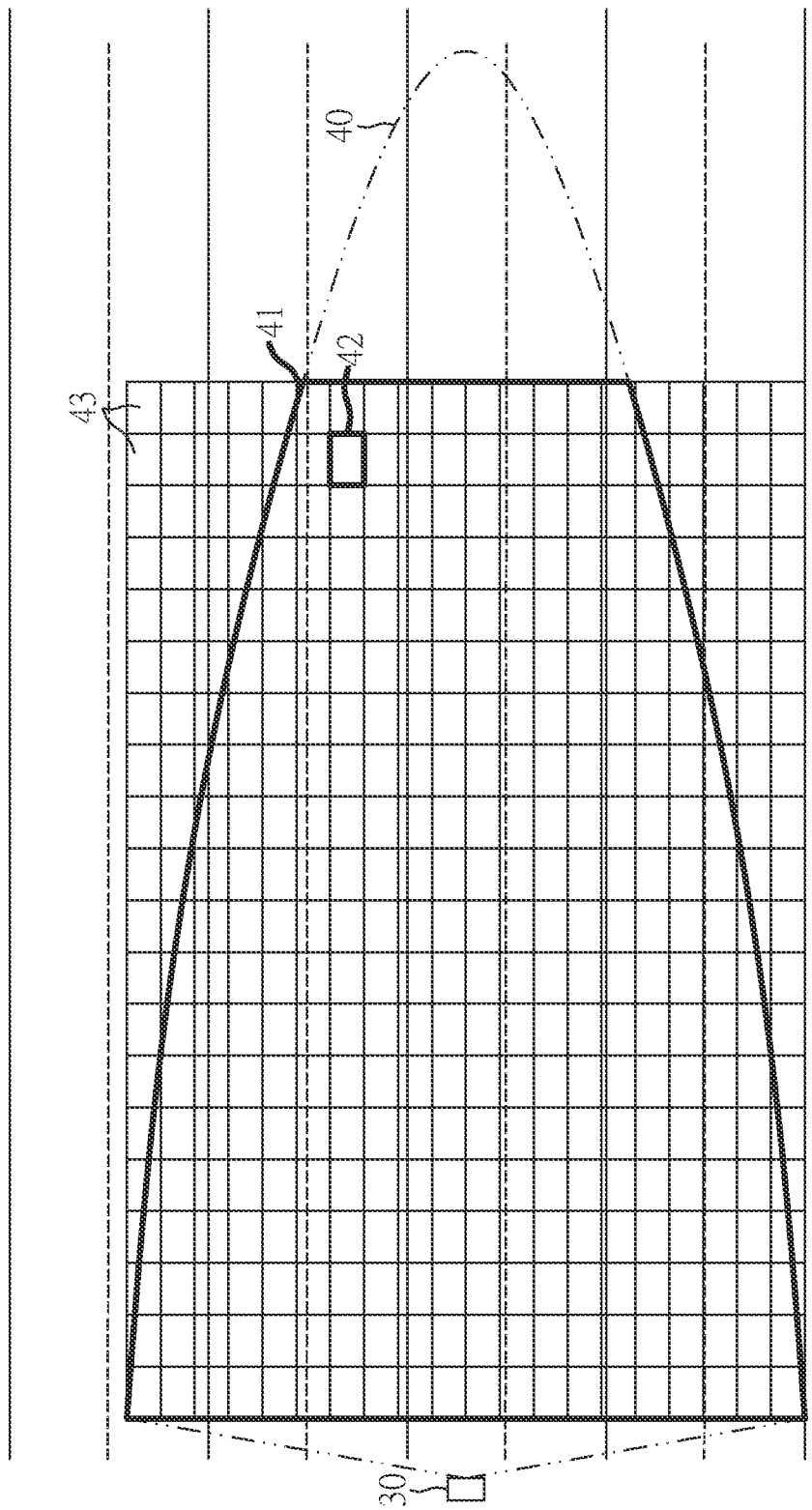
FIG. 4 is a schematic diagram showing a predetermined antenna pattern covering a detection area according to one embodiment of the present disclosure.

Referring further to FIG. 4, FIG. 4 is a schematic diagram of a predetermined antenna pattern covering a detection area according to one embodiment of the present disclosure. For example, the FMCW radar 30 transmits a detection signal toward a detection area 41 with a predetermined antenna pattern 40 that covers the detection area 41, and receives the reflected signal. The processing circuit 14 can process the reflected signal, such that the reflected signal is converted from the initial form of polar coordinates into the form of the Cartesian coordinates. Further, the processing circuit 14 can divide the detection area 41 into a plurality of sub-areas 42 with regular intervals according to the Cartesian coordinate. In this embodiment, the sub-areas 42 correspond to a plurality of grids 43 shown in FIG. 4, and each of the sub-areas 42 has a row size (hereinafter referred to as ROW) and a column size (hereinafter referred to as COL). The sub-areas 42 are used to determine a position of a target relative to the radar, but the number and the shape of the sub-areas 42 are not limited in the present disclosure.

Furthermore, the detection method provided by the present disclosure includes two phases: the initialization phase and the normal operation phase. In the initialization phase, the radar needs to be calibrated according to the environment, and multiple radar cycles need to be executed to monitor stationary objects in the environment, such as guardrails, trees, and poles. When there is no stationary or slow-moving vehicle in the detection area, said initialization phase can be performed.

The so-called radar cycle is the above-mentioned detection process. The radar cycle is defined by an update rate (1/Ts) of a radar system. In each new radar cycle, the detection system 1 starts to measure the current environment, so as to perform a new detection process. In addition, the number of times that the detection process must be executed during the initialization phase can be controlled by a parameter N. If the radar update rate is 1/Ts, an initialization cycle is N*Ts, which means that the initialization phase is performed after N times of update. However, the radar cycle can be a fixed cycle or a variable cycle. Therefore, in the present disclosure, time of the initialization cycle is not limited by the update rate. Instead, the initialization phase and the normal operation phase are described by the number of times that the detection process is executed.

Figure 5:
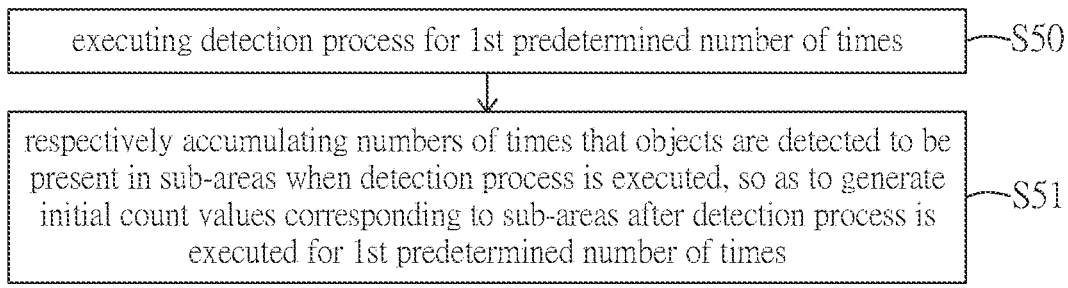
FIG. 5 is a flowchart of an initialization phase according to one embodiment of the present disclosure.

Reference is made to FIG. 5, which is a flowchart of an initialization phase according to one embodiment of the present disclosure. The detection method includes configuring the processing circuit 14 to perform the initialization phase, which includes the following steps.

Step S50: executing the detection process for a first predetermined number of times.

Step S51: respectively accumulating numbers of times that the objects are detected to be present in the plurality of sub-areas when the detection process is executed, so as to generate a plurality of initial count values corresponding to the plurality of sub-areas after the detection process is executed for the first predetermined number of times. The plurality of initial count values are used to respectively indicate whether or not existing stationary objects are present in the plurality of sub-areas.

For example, in the initialization phase, the radar records the detected objects for all grids (sub-areas) in the detection area within a fixed period of time, and the detection process needs to be performed for several times. For example, [ROW][COL] being [10][10] represents a total of 10*10 grids, and the number of sub-areas corresponds to the number of grids. At this phase, the number of times of detecting objects in the detection processes is recorded and counted, which is referred to as a number of detections.

For one sub-area, the counted number of detections shows a probability of existence of stationary objects in the one sub-area. Even if the detection is caused by noises, the number of detections from real stationary objects exceeds the number of detections from the noises. The processing circuit 14 can accumulate the number of detections of each sub-area, and store the same in the memory 16 for future reference.

Figure 6:
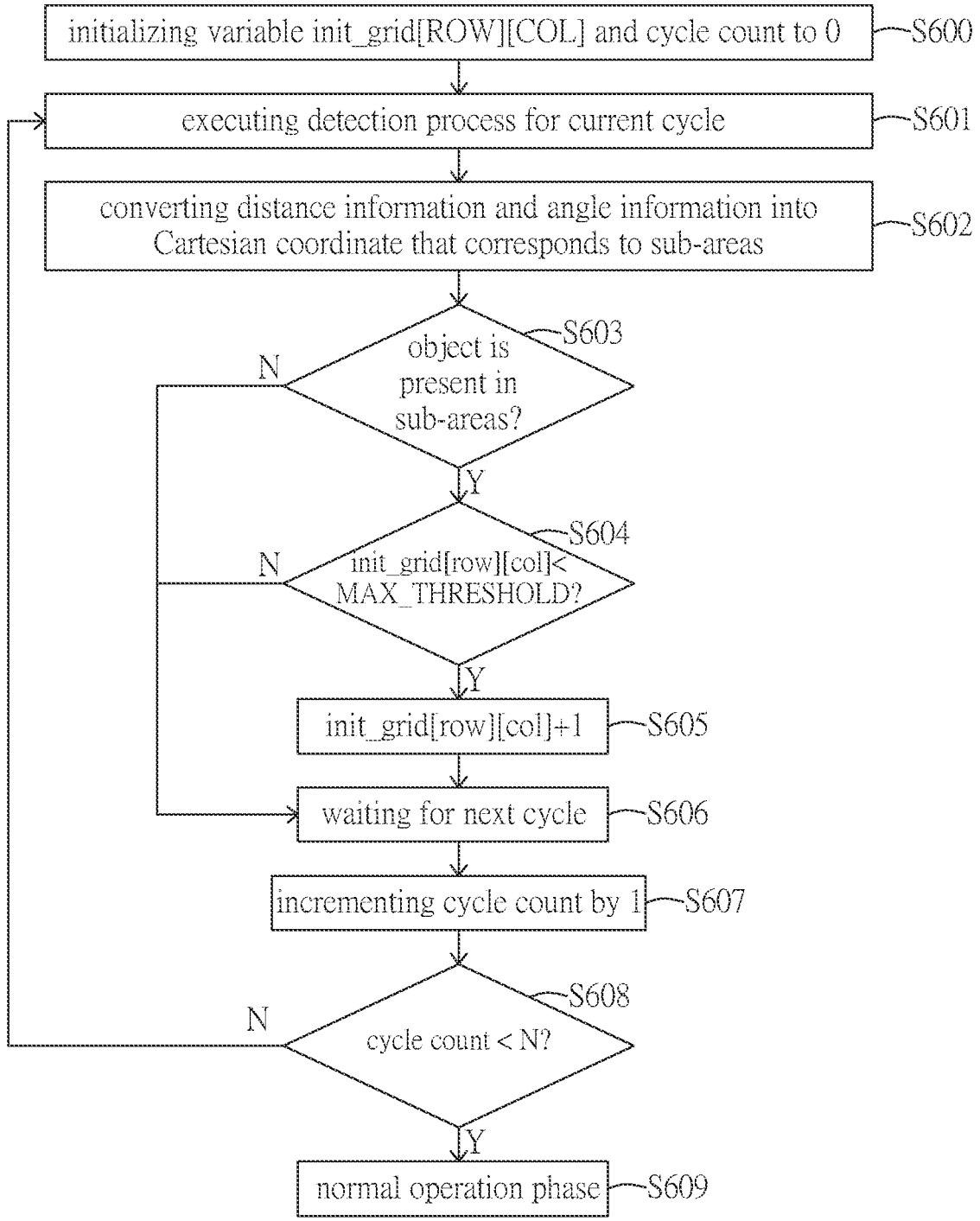
FIG. 6 is another flowchart of the initialization phase according to one embodiment of the present disclosure.

Reference is made to FIG. 6, which is another flowchart of the initialization phase according to one embodiment of the present disclosure. As shown in FIG. 6, after the initialization phase is embodied, the following steps are provided.

Step S600: initializing a variable init_grid[ROW][COL] and a cycle count to 0.

The variable init_grid[ROW][COL] is used to store a cumulative number of detections when a total number of the sub-areas is COL*ROW, and the cycle count is used to keep track of a cycle number.

Step S601: executing the detection process for a current cycle.

Step S602: converting the distance information and the angle information into the Cartesian coordinate that corresponds to the sub-areas.

Step S603: determining whether or not an object is present in the sub-areas.

In response to detecting that the object is present in the sub-area, the initialization phase proceeds to step S604: determining whether a variable init_grid[row][col] is less than a variable MAX_THRESHOLD.

The variable init_grid[row][col] is used to store the cumulative number of detections of a sub-area [row][col], and the variable MAX_THRESHOLD is a maximum allowable value of the variable init_grid[row][col]. In other words, when an object is detected in one sub-area, the variable init_grid[row][col] corresponding to the one sub-area increases, and "row" and "col" define a position of the one sub-area. For example, when [ROW][COL] is [10][10], the total number of sub-areas is 10*10, and [row][col] representing the positions of the sub-areas can be [0][0] to [9][9]. Corresponding to step S51, when the initial count value for one of the sub-areas is accumulated to exceed a count threshold set by the variable MAX_THRESHOLD, the accumulation is stopped, and the variable MAX_THRESHOLD is used as the initial count value.

In response to the variable init_grid[row][col] being less than the variable MAX_THRESHOLD, the initialization phase proceeds to step S605: incrementing the variable init_grid[row][col] by 1.

Then, the initialization phase proceeds to step S606: waiting for a next cycle to begin.

It should be noted that, in response to determining in step S603 that no object is detected in the sub-areas, or in response to determining in step S604 that the variable init_grid[row][col] is not less than the variable MAX_THRESHOLD, the initialization phase proceeds to step S606. In one cycle, all the sub-areas are detected once, and the variable init_grid[row][col] is updated.

Step S607: incrementing the cycle count by 1. Here, the cycle count corresponds to the number of cycles mentioned above.

Step S608: determining whether or not the cycle count is less than N. Here, N represents the number of times that the detection process must be executed in the initialization phase (i.e., the first predetermined number of times mentioned in step S50).

In response to determining that the cycle count is less than N, the initialization phase returns to step S601.

In response to determining that the cycle count is not less than N, the initialization phase ends, and the detection method proceeds to step S609: the normal operation phase.

In detail, under this mechanism, if there is a stationary object in the sub-area represented by the variable init_grid [row][col], a value of the variable init_grid[row][col] will increase to a larger value at the end of the initialization phase. If there is no stationary object in the sub-area represented by the variable init_grid[row][col], the value of the variable init_grid[row][col] will be a very small value at the end of the initialization phase.

Figure 7:
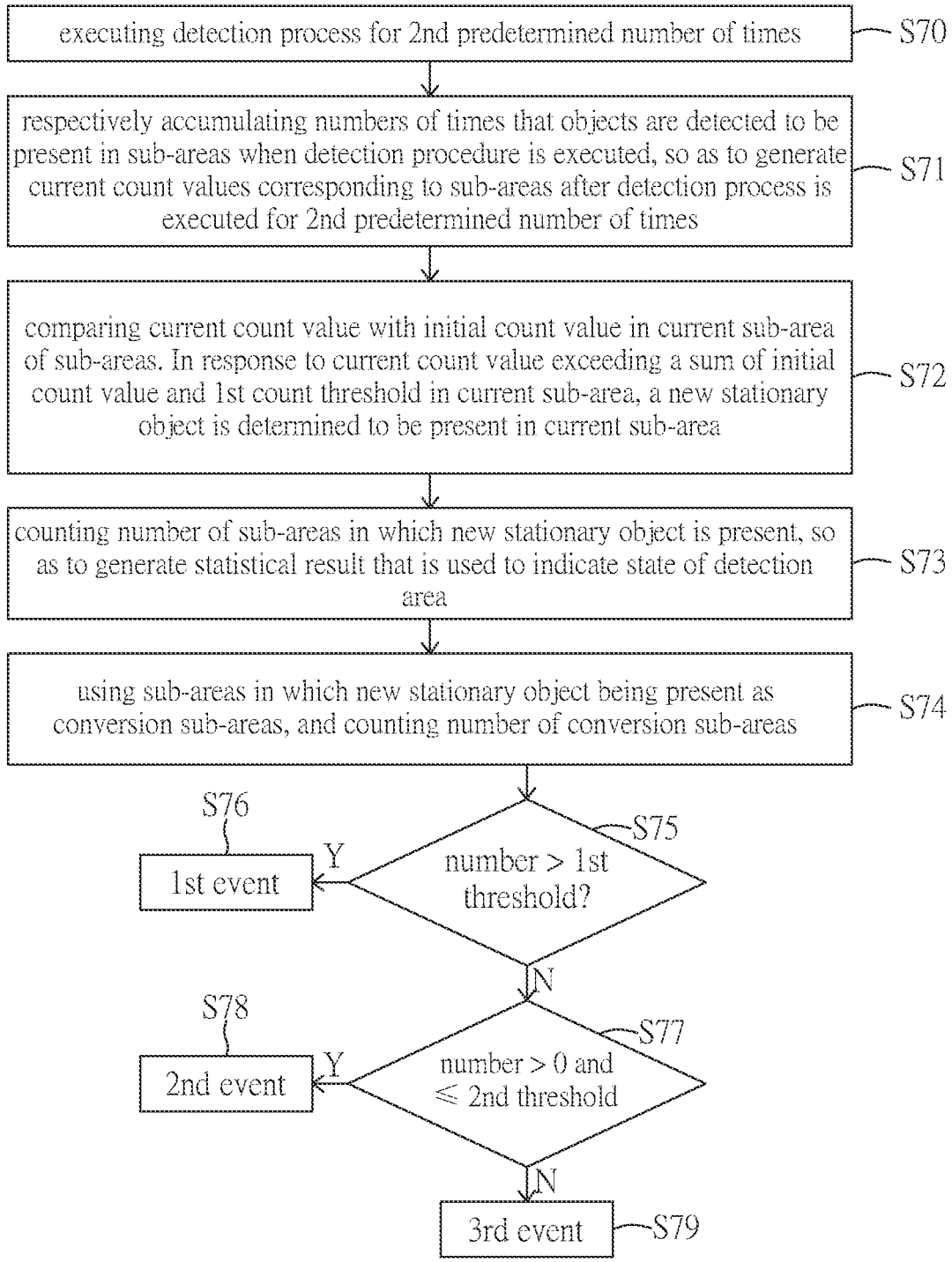
FIG. 7 is a flowchart of a normal operation phase according to one embodiment of the present disclosure.

FIG. 7 is a flowchart of a normal operation phase according to one embodiment of the present disclosure.

The detection method includes configuring the processing circuit 14 to execute the normal operation phase after the initialization phase, and the normal operation phase includes the following steps.

Step S70: executing the detection process for a second predetermined number of times. In this step, the second predetermined number of times is greater than the first predetermined number of times. Otherwise, in the subsequent steps, a value accumulated by the second predetermined number of times may not exceed the value of the variable init_grid[row][col] accumulated by the first predetermined number of times, and a comparison between the two may become meaningless.

Step S71: respectively accumulating numbers of times that the objects are detected to be present in the plurality of sub-areas when the detection procedure is executed, so as to generate a plurality of current count values corresponding to the plurality of sub-areas after the detection process is executed for the second predetermined number of times. This step is similar to step S51 in the initialization phase, and the difference lies only in the number of times that the detection process is executed.

Step S72: comparing the current count value with the initial count value in a current sub-area of the plurality of sub-areas. In response to the current count value exceeding a sum of the initial count value and a first count threshold in the current sub-area, (i.e., the current count value minus the initial count value is greater than the first count threshold) a new stationary object is determined to be present in the current sub-area.

In detail, this step is performed to compare the current count value of each of the sub-areas with the initial count value to determine whether or not a new stationary object appears. In other words, the sub-areas whose initial count values have a certain amount (such as the variable MAX_THRESHOLD) are regarded as sub-areas in which existing stationary objects are present, and these sub-areas are used as a criterion for determining whether or not new stationary objects appear.

Step S73: counting a number of the plurality of sub-areas in which the new stationary object is present, so as to generate a statistical result that is used to indicate a state of the detection area.

Reference is made to FIG. 7 again. For example, for the detection area set on the road, step S73 can be used to determine the road condition according to the statistical result. For example, the normal operation phase can further include configuring the processing circuit 14 to perform the following steps.

Step S74: using the plurality of sub-areas in which the new stationary object being present as a plurality of conversion sub-areas, and counting a number of the plurality of conversion sub-areas.

Step S75: determining whether or not the number of the conversion sub-areas is greater than a first threshold. In response to the number of the conversion sub-areas being greater than the first threshold, the normal operation phase proceeds to step S76. In response to the number of the conversion sub-areas being not greater than the first threshold, the normal operation phase proceeds to step S77.

Step S76: determining that the state of the detection area is in a first event.

Step S77: determining whether or not the number of the conversion sub-areas is greater than zero and less than or equal to a second threshold. In response to the number of the conversion sub-areas being greater than zero and being less than or equal to the second threshold, the normal operation phase proceeds to step S78. If not, the normal operation phase proceeds to step S79.

Step S78: determining that the state of the detection area is in a second event. It should be noted that the first threshold is greater than the second threshold.

Step S79: determining that the state of the detection area is in a third event.

In detail, an application of the first threshold is that if new stationary objects are detected in a large number of the sub-areas, the state of the detection area can be determined to be in the first event. That is, there is heavy traffic or even traffic jams in the detection area, and the number of conversion sub-areas required to trigger this warning can be set by the first threshold. In one embodiment, the first threshold can be, for example, a variable JAM_THRESHOLD.

On the other hand, an application of the second threshold is that if new stationary targets are only detected in a few sub-areas, the state of the detection area can be determined to be in the second event. That is, there may be one or more obstacles or stopped vehicles in the detection area (on the road), and the number of conversion sub-areas required to trigger this warning can be set by the second threshold. In one embodiment, the second threshold can be, for example, a variable SVD_THRESHOLD.

When the number of conversion sub-areas is less than or equal to the second threshold, or is zero, such a condition means that there are not too many stationary objects in the detection area, and the state of the detection area can be determined to be in the third event (for example, the road is considered to be unobstructed).

Figure 8:
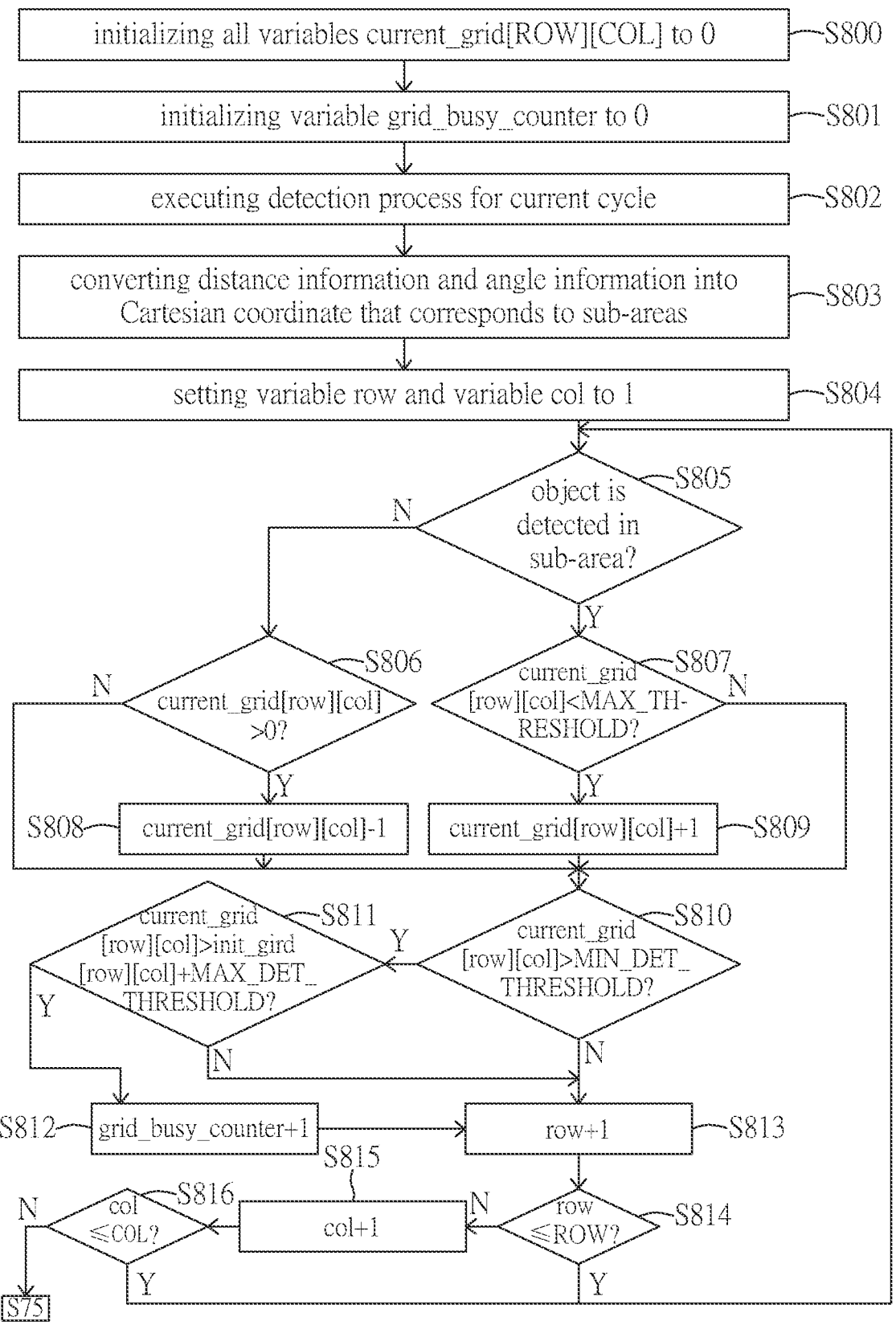
FIG. 8 is another flowchart of the normal operation phase according to one embodiment of the present disclosure.

Reference is made to FIG. 8, which is another flowchart of the normal operation phase according to one embodiment of the present disclosure. As shown in FIG. 8, after the normal operation phase is embodied, the following steps are provided.

Step S800: initializing all variables current_grid[ROW][COL] to 0. In the normal operation phase, the variable current_grid[ROW][COL] is used to store detection status, a size of the variable current_grid is COL*ROW, and the variable current_grid is initialized to 0 at the beginning of the normal operation phase.

Step S801: initializing a variable grid_busy_counter to 0. The variable grid_busy_counter represents the number of the aforementioned conversion sub-areas.

Step S802: executing the detection process for a current cycle.

Step S803: converting the distance information and the angle information into the Cartesian coordinate that corresponds to the sub-areas.

Step S804: setting the variable row and the variable col to 1.

Step S805: determining whether or not an object is detected in the sub-area corresponding to the variables "col" and "row". In response to determining that the object is detected in the sub-area corresponding to the variables "col" and "row", the normal operation phase proceeds to step S806. In response to determining that the object is not detected in the sub-area corresponding to the variables "col" and "row", the normal operation phase proceeds to step S807.

Step S806: determining whether or not the variable current_grid[row][col] is greater than zero. In response to determining that the variable current_grid[row][col] is greater than zero, the normal operation phase proceeds to step S808. In response to determining that the variable current_grid[row][col] is not greater than zero, the normal operation phase proceeds to step S810.

Each time the detection process is executed, an object can be detected in the detection area, and a position of the detected object corresponds to a value of the variable current_grid defined by row and col (that is, the current sub-area described previously), and a lower limit of the variable current_grid is 0. If any object is detected in the current sub-area corresponding to the variable current_grid[row][col], the value of the variable current_grid[row][col] is incremented, otherwise the value is decremented.

Step S808: decreasing the variable current_grid[row][col] by 1. The normal operation phase proceeds to step S810.

Step S807: determining whether the variable current_grid[row][col] is less than the variable MAX_THRESHOLD. An upper limit of the value of the variable current_grid[row][col] is the variable MAX_THRESHOLD.

In response to determining that the variable current_grid[row][col] is less than the variable MAX_THRESHOLD, the normal operation phase proceeds to step S809. If not, the normal operation phase proceeds to step S810.

Step S809: incrementing the variable current_grid[row][col] by 1. The normal operation phase proceeds to step S810.

Step S810: determining whether the variable current_grid[row][col] is greater than a variable MIN_DET_THRESHOLD. In response to determining that the variable current_grid[row][col] is greater than the variable MIN_DET_THRESHOLD, the normal operation phase proceeds to step S811. In response to determining that the variable current_grid[row][col] is not greater than the variable MIN_DET_THRESHOLD, the normal operation phase proceeds to step S813.

A value of the variable MIN_DET_THRESHOLD is used to determine whether the value of the variable current_grid[row][col] is noise before a comparison is made between the variable current_grid[row][col] and the variable init_grid[row][col], so as to distinguish the noise from a real stationary object.

Step S811: determining whether the variable current_grid[row][col] is greater than the variable init_grid[row][col] plus the variable MAX_DET_THRESHOLD. In response to determining that the variable current_grid[row][col] is greater than the variable init_grid[row][col] plus the variable MAX_DET_THRESHOLD, the normal operation phase proceeds to step S813.

In detail, if the value of the variable current_grid[row][col] is equal to the value of the variable init_grid[row][col], the environment corresponding to this current sub-area is not changed much since the initialization phase is performed.

If a new object appears in the current sub-area, the number of detections increases, which makes the value of the variable current_grid[row][col] higher than the value of the variable init_grid[row][col]. If the object is leaving the current sub-area, no object is detected in the current sub-area, and the value of the variable current_grid[row][col] decreases to the value of the variable init_grid[row][col] or lower.

If the variable current_grid[row][col] exceeds the variable init_grid[row][col] plus a certain threshold (e.g., the variable MAX_DET_THRESHOLD), a new stationary object is determined to appear at a position of the corresponding current sub-area, and the detected stationary object can be processed. The variable MAX_DET_THRESHOLD can further be used to prevent misjudgment on presence of new stationary objects in the current sub-area.

However, the value of the variable current_grid[row][col] being less than or equal to the value of the variable init_grid[row][col] means that no new stationary object appears since the initialization phase is performed, and all detected values can be neglected in the subsequent processes. In addition, the variable MAX_DET_THRESHOLD can be obtained through experimentation or statistical analysis, so as to measure activities in the current sub-region.

Step S812: incrementing the variable grid_busy_counter by 1. In other words, the current sub-area that meets the condition of step S811 can be regarded as the conversion sub-area where the new stationary object appears, and the number of conversion sub-areas can be counted by using the variable grid_busy_counter.

Step S813: incrementing the variable row by 1.

Step S814: determining whether or not the variable row is less than or equal to ROW. In response to determining that the variable row is less than or equal to ROW, the normal operation phase returns to step S805. In response to determining that the variable row is not less than or equal to ROW, the normal operation phase proceeds to step S815.

Step S815: incrementing the variable col by 1.

Step S816: determining whether the variable col is less than or equal to COL. In response to determining that the variable row is less than or equal to COL, the normal operation phase returns to step S805. In response to determining that the variable col is not less than or equal to COL, the normal operation phase proceeds to step S75.

Therefore, it can be conceived that the detection system and the detection method provided by the present disclosure can be used to assist a traffic control system in decision-making after the state of the detection area is determined, and can operate in cooperation with the traditional radar system. The detection system and the detection method can also be integrated with a road monitoring system in the form of software module, so as to improve performance of the traditional radar system for detecting obstacles and traffic congestion.

Beneficial Effects of the Embodiments

In conclusion, the detection system and the detection method provided by the present disclosure can record an environment and stationary objects, use the recorded data to detect new stationary objects, and distinguish the new stationary objects from existing stationary objects.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A detection system, comprising:
a transmitter;
a receiver; and
a processing circuit connected to the transmitter and the receiver, wherein the processing circuit is configured to execute a detection process, which includes:
controlling the transmitter to transmit a detection signal toward a detection area with a predetermined antenna pattern, wherein the predetermined antenna pattern covers the detection area;
controlling the receiver to receive a plurality of reflected signals; and
processing the plurality of reflected signals to generate a detection result, so as to respectively determine whether or not objects are present in a plurality of sub-areas of the detection area;
wherein the processing circuit is configured to perform an initialization phase, which includes:
executing the detection process for a first predetermined number of times; and
respectively accumulating numbers of times that the objects are detected to be present in the plurality of sub-areas when the detection process is executed, so as to generate a plurality of initial count values corresponding to the plurality of sub-areas after the detection process is executed for the first predetermined number of times, wherein the plurality of initial count values are used to respectively indicate whether or not existing stationary objects are present in the plurality of sub-areas;
wherein the processing circuit is configured to perform a normal operation phase after the initialization phase, and the normal operation phase includes:
executing the detection process for a second predetermined number of times;
respectively accumulating numbers of times that the objects are detected to be present in the plurality of sub-areas when the detection procedure is executed, so as to generate a plurality of current count values corresponding to the plurality of sub-areas after the detection process is executed for the second predetermined number of times;
comparing the current count value with the initial count value in a current sub-area of the plurality of sub-areas, wherein, in response to the current count value exceeding a sum of the initial count value and a first count threshold in the current sub-area, a new stationary object is determined to be present in the current sub-area; and
counting a number of the plurality of sub-areas in which the new stationary object is present, so as to generate a statistical result that is used to indicate a state of the detection area.

2. The detection system according to claim 1, wherein, in the detection process, the processing circuit is configured to:

process the plurality of reflected signals, so as to obtain distance information and angle information of a detected object that reflects the detection signal; and convert the obtained distance information and the obtained angle information into position information of a plurality of grids, wherein the grids correspond to the plurality of sub-areas.

3. The detection system according to claim 1, wherein, in a step where the plurality of initial count values are generated in the initialization phase, in response to one of the initial count values of one of the sub-areas exceeding a second count threshold, an accumulation of the one of the initial count values is stopped, and the second count threshold is used as the one of the initial count values.

4. The detection system according to claim 1, wherein, in the normal operation phase, the processing circuit is configured to use the plurality of sub-areas in which the new stationary object is present as a plurality of conversion sub-areas, to count a number of the plurality of conversion sub-areas, and to compare the number of the plurality of conversion sub-areas with a first threshold, wherein, in response to the number of the plurality of conversion sub-areas being greater than the first threshold, the processing circuit determines that the state of the detection area is in a first event.

5. The detection system according to claim 4, wherein, in the normal operation phase, the processing circuit is configured to count the number of the plurality of conversion sub-areas, and to compare the number of the plurality of conversion sub-areas with a second threshold; wherein, in response to the number of the plurality of conversion sub-areas being greater than zero and being less than or equal to the second threshold, the processing circuit determines that the state of the detection area is in a second event.

6. The detection system according to claim 5, wherein the first threshold is greater than the second threshold.

7. The detection system according to claim 1, wherein the second predetermined number of times is greater than the first predetermined number of times.

8. A detection method, comprising:
   configuring a processing circuit connected to a transmitter and a receiver to execute a detection process, which includes:
      controlling the transmitter to transmit a detection signal toward a detection area with a predetermined antenna pattern, wherein the predetermined antenna pattern covers the detection area;
      controlling the receiver to receive a plurality of reflected signals; and
      processing the plurality of reflected signals to generate a detection result, so as to respectively determine whether or not objects are present in a plurality of sub-areas of the detection area;
   configuring the processing circuit to perform an initialization phase, which includes:
      executing the detection process for a first predetermined number of times; and
      respectively accumulating numbers of times that the objects are detected to be present in the plurality of sub-areas when the detection process is executed, so as to generate a plurality of initial count values corresponding to the plurality of sub-areas after the detection process is executed for the first predetermined number of times, wherein the plurality of initial count values are used to respectively indicate whether or not existing stationary objects are present in the plurality of sub-areas; and
   configuring the processing circuit to perform a normal operation phase after the initialization phase, and the normal operation phase includes:
      executing the detection process for a second predetermined number of times;
      respectively accumulating numbers of times that the objects are detected to be present in the plurality of sub-areas when the detection process is executed, so as to generate a plurality of current count values corresponding to the plurality of sub-areas after the detection process is executed for the second predetermined number of times;
      comparing the current count value with the initial count value in a current sub-area of the plurality of sub-areas, wherein, in response to the current count value exceeding a sum of the initial count value and a first count threshold in the current sub-area, a new stationary object is determined to be present in the current sub-area; and
      counting a number of the plurality of sub-areas in which the new stationary object is present, so as to generate a statistical result that is used to indicate a state of the detection area.

9. The detection method according to claim 8, wherein the detection process further includes configuring the processing circuit to:
   process the plurality of reflected signals, so as to obtain distance information and angle information of a detected object that reflects the detection signal; and
   convert the obtained distance information and the obtained angle information into position information of a plurality of grids, wherein the grids correspond to the plurality of sub-areas.

10. The detection method according to claim 8, wherein, in a step where the plurality of initial count values are generated in the initialization phase, in response to one of the initial count values of one of the sub-areas exceeding a second count threshold value, an accumulation of the one of the initial count values is stopped, and the second count threshold is used as the one of the initial count values.

11. The detection method according to claim 8, wherein the normal operation phase further includes configuring the processing circuit to use the plurality of sub-areas in which the new stationary object is present as a plurality of conversion sub-areas, to count a number of the plurality of conversion sub-areas, and to compare the number of the plurality of conversion sub-areas with a first threshold, wherein, in response to the number of the plurality of conversion sub-areas being greater than the first threshold, the processing circuit determines that the state of the detection area is in a first event.

12. The detection method according to claim 11, wherein the normal operation phase further includes:
   configuring the processing circuit to count the number of the plurality of conversion sub-areas, and to compare the number of the plurality of conversion sub-areas with a second threshold; and
   configuring the processing circuit to, in response to the number of the plurality of conversion sub-areas being greater than zero and being less than or equal to the second threshold, determine that the state of the detection area is in a second event.

13. The detection method according to claim 12, wherein the first threshold is greater than the second threshold.

14. The detection method according to claim 8, wherein the second predetermined number of times is greater than the first predetermined number of times.

* * * * *